(12) United States Patent
Diab

(10) Patent No.: US 7,565,555 B2
(45) Date of Patent: Jul. 21, 2009

(54) UNINTERRUPTIBLE POWER SUPPLY RESOURCE SHARING FOR MULTIPLE POWER SOURCING EQUIPMENT NETWORK DEVICES

(75) Inventor: Wael William Diab, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 482 days.

(21) Appl. No.: 11/286,176

(22) Filed: Nov. 23, 2005

(65) Prior Publication Data

US 2007/0118772 A1    May 24, 2007

(51) Int. Cl.
*G06F 1/26* (2006.01)
(52) U.S. Cl. ........................ 713/300; 713/310; 713/340
(58) Field of Classification Search ......... 713/300–375; 714/22, 47
See application file for complete search history.

(56) References Cited

U.S. PATENT DOCUMENTS

| | | | |
|---|---|---|---|
| 4,835,737 A | 5/1989 | Herrig et al. |
| 5,122,691 A | 6/1992 | Balakrishnan |
| 5,237,511 A | 8/1993 | Caird et al. |
| 5,268,592 A | 12/1993 | Bellamy et al. |
| 5,289,359 A | 2/1994 | Ziermann |
| 5,386,567 A | 1/1995 | Lien et al. |
| 5,406,260 A | 4/1995 | Cummings et al. |
| 5,461,671 A | 10/1995 | Sakuragi et al. |
| 5,483,574 A | 1/1996 | Yuyama |
| 5,491,804 A | 2/1996 | Heath et al. |
| 5,531,612 A | 7/1996 | Goodall et al. |
| 5,608,792 A | 3/1997 | Laidler |
| 5,613,130 A | 3/1997 | Teng et al. |
| 5,639,267 A | 6/1997 | Loudermilk |
| 5,726,506 A | 3/1998 | Wood |
| 5,742,513 A | 4/1998 | Bouhenguel et al. |
| 5,758,102 A | 5/1998 | Carey et al. |
| 5,775,946 A | 7/1998 | Briones |
| 5,790,391 A | 8/1998 | Stich et al. |
| 5,790,873 A | 8/1998 | Popper et al. |
| 5,793,987 A | 8/1998 | Quackenbush et al. |
| 5,796,185 A | 8/1998 | Takata et al. |
| 5,809,256 A | 9/1998 | Najemy |
| 5,834,925 A | 11/1998 | Chesavage |

(Continued)

OTHER PUBLICATIONS

"IEEE Standard 802.3af™", IEEE Standard for Information Technology-Telecommunications and Information Exchange Between Systems-Local and Metropolitan Area Networks-Specific Requirement, IEEE The Institute of Electrical and Electronics Engineering, Inc., Jun. 18, 2003.

(Continued)

*Primary Examiner*—Thomas Lee
*Assistant Examiner*—Paul B Yanchus, III
(74) *Attorney, Agent, or Firm*—BainwoodHuang

(57) ABSTRACT

In a network deploying a plurality of network devices with PSE capabilities, a UPS resource may be effectively shared among those network devices by selecting at least one network device to be "master" and transmitting information reflecting worst case power commitments from "slave" network devices to the at least one master network device so that the master network device may keep track of the worst case power commitments of the plural network devices as a group. This information is compared to the known capabilities of the UPS resource and, where a deficiency or near-deficiency exists, the situation is communicated to network management for responsive action.

40 Claims, 10 Drawing Sheets

U.S. PATENT DOCUMENTS

| | | | |
|---|---|---|---|
| 5,884,233 A | 3/1999 | Brown | |
| 5,991,885 A | 11/1999 | Chang et al. | |
| 5,994,998 A | 11/1999 | Fisher et al. | |
| 6,033,266 A | 3/2000 | Long | |
| 6,036,547 A | 3/2000 | Belopolsky et al. | |
| 6,059,581 A | 5/2000 | Wu | |
| 6,068,520 A | 5/2000 | Winings et al. | |
| 6,099,349 A | 8/2000 | Boutros | |
| 6,115,468 A | 9/2000 | De Nicolo | |
| 6,134,666 A | 10/2000 | De Nicolo | |
| 6,162,089 A | 12/2000 | Costello et al. | |
| 6,218,930 B1 | 4/2001 | Katzenberg et al. | |
| 6,233,128 B1 | 5/2001 | Spencer et al. | |
| 6,310,781 B1 | 10/2001 | Karam | |
| 6,396,392 B1 | 5/2002 | Abraham | |
| 6,496,105 B2 | 12/2002 | Fisher et al. | |
| 6,541,878 B1 | 4/2003 | Diab | |
| 6,594,771 B1 * | 7/2003 | Koerber et al. | 713/330 |
| 6,701,443 B1 | 3/2004 | Bell | |
| 6,762,675 B1 | 7/2004 | Cafiero et al. | |
| 6,804,351 B1 | 10/2004 | Karam | |
| 2005/0229037 A1 * | 10/2005 | Egan et al. | 714/14 |
| 2007/0083774 A1 * | 4/2007 | Baurer et al. | 713/300 |

OTHER PUBLICATIONS

"3Com® NJ100 Network Jack Power", printed from http://www.poweroverethernet.com/manual/content/view/full/776/, 3Com, Tuesday, Mar. 18, 2003.

3Com User Guide-3Com IntelliJack, Model NJ220, Version 1.0, 3Com, Nov. 2003.

* cited by examiner

UNINTERRUPTIBLE POWER SUPPLY RESOURCE SHARING FOR MULTIPLE POWER SOURCING EQUIPMENT NETWORK DEVICES

FIELD OF THE INVENTION

The present invention relates generally to data telecommunications networking equipment which is powered by and/or powers other networking equipment over wired data telecommunications network connections. More particularly, it is directed to such equipment incorporating uninterruptible power supply (UPS) systems such as Cisco Systems, Inc.'s (of San Jose, Calif.) Redundant Power Supply (RPS) systems, and other similar power backup systems to power such equipment in the event of power disruption.

BACKGROUND OF THE INVENTION

Inline power (also sometimes referred to as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

A form of PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 820.3af standard is a globally applicable standard for combining the transmission of Ethernet packets with the transmission of DC-based power over the same set of wires in a single Ethernet cable. It is contemplated that Inline power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard. Two conductor wiring such as shielded or unshielded twisted pair wiring (or coaxial cable or other conventional network cabling) may be used so each transmitter and receiver has a pair of conductors associated with it.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether inline power is delivered over Pair 1-2, Pair 3-4 or Pair 1-2 +Pair 3-4. In the circuit shown in FIG. 1E a PD associated with Pair 1-2 is powered by inline power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline power is also available through techniques that are non-IEEE 802.3 standard compliant as is well known to those of ordinary skill in the art.

In order to provide regular inline power to a PD from a PSE it is a general requirement that two processes first be accomplished. First, a "discovery" process must be accomplished to verify that the candidate PD is, in fact, adapted to receive inline power. Second, a "classification" process must be accomplished to determine an amount of inline power to allocate to the PD, the PSE having a finite amount of inline power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. In accordance with the IEEE 802.3af standard, a 25,000 ohm resistor, for example, may be presented for discovery by the PD. The resistor may be present at all times or it may be switched into the circuit during the discovery process in response to discovery signals from the PSE.

The PSE applies some inline power (not "regular" inline power, i.e., reduced voltage and limited current) as the discovery signal to measure resistance across the two pairs of conductors to determine if the identity network is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular inline power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
|---|---|---|
| 0 | 0-5 | 15.4 |
| 1 | 8-13 | 4.0 |
| 2 | 16-21 | 7.0 |
| 3 | 25-31 | 15.4 |
| 4 | 35-45 | Reserved |

The discovery process is therefore used in order to avoid providing inline power (at full voltage of −48 VDC) to so-called "legacy" devices which are not particularly adapted to receive or utilize inline power.

The classification process is therefore used in order to manage inline power resources so that available power resources can be efficiently allocated and utilized. Accordingly, network devices (such as Ethernet switches, for example) acting as PSEs to provide inline power to PDs keep track of the class of the attached PD (and therefore its worst case power draw) by maintaining a database in memory at the network device. This function is normally managed by the network device operating system (referred to as "IOS" or the "Internetworking Operating System" in Cisco Systems, Inc.'s network switches).

Uninterruptible Power Supply (UPS) backup is an expensive but important resource in data telecommunications networks. Inline power applications obviously require additional power resources beyond those necessary to simply power the network devices themselves and assuring continued operation of such applications in the event of a power failure requires substantially larger UPS resources than previously required.

FIG. 2 is a block diagram illustrating a data telecommunications network configuration having a single network device (switch) and a UPS device providing power backup resources to a single power supply associated with the network device in accordance with the prior art.

In the configuration shown in FIG. 2 UPS 30 obtains its power from AC mains supply 32. UPS 30 may be any appropriate form of high-reliability power supply such as a conventional battery-powered inverter, generator, or the like. The UPS 30 provides reliable power to a power supply 34 of network device 36 over line 37. Network device 36 is configured as a PSE device with PSE ports 38a, 38b, 38c and 38d. Corresponding PDs 40a, 40b, 40c and 40d receive inline power from these corresponding ports.

FIG. 3 is a block diagram illustrating a data telecommunications network configuration having a single network device (switch) and a UPS device providing power backup resources to a pair of power supplies associated with the network device in accordance with the prior art.

The configuration shown in FIG. 3 differs slightly from that of FIG. 2 in that network device 36' has two power supplies 34a and 34b which are powered over corresponding lines 37a and 37b. In a configuration like that' shown, the supplies 34a, 34b may be fully redundant supplies or one may be configured to supply power to the network device circuitry while the other is dedicated to supplying power to the PSE circuitry for powering the attached PDs.

As the number of inline power applications and the power demand per inline power application increases in conjunction with increased critical and high availability requirements for inline power, there is an increased demand on UPS systems. Nevertheless, UPS systems continue to be a relatively high-cost and limited resource. UPS system costs, rack space, thermal dissipation, battery requirements and power outlet requirements are some of the constraints faced by those intending to deploy such systems. It is therefore not uncommon to implement a system where a single UPS system is shared or pooled across a number of network devices (such as Ethernet switches).

FIG. 4 is a block diagram illustrating a data telecommunications network configuration having a pair of network devices (switches) and a UPS device providing power backup resources to individual power supplies associated with the pair of network devices in accordance with the prior art.

In the configuration illustrated in FIG. 4 UPS 30 provides UPS resources to both network device 36-1 (via power supply 34-1 and line 37-1) and network device 36-2 (via power supply 34-2 and line 37-2). Network device 36-1 has PSE ports 38-1a through 38-1d and powers corresponding PDs 40-1a through 40-1d. Network device 36-2 has PSE ports 38-2a through 38-2d and powers corresponding PDs 40-2a through 40-2d.

When more than one PSE device such as inline power enabled Ethernet switches are coupled to a single UPS resource, at least two problems arise. First, the UPS resource may become inadvertently oversubscribed beyond its current- or power-delivering capability in providing backup power for the plural network devices. Moreover, if such a scenario exists, then it may only become apparent for the first time when the power fails resulting in an unpredictable and possibly undesirable outcome. Second, those deploying such systems are faced with the difficult decision of whether to spend money up front by planning for the worst case load based on the maximum potential inline power load even though the system may always operate at a fraction of that load (e.g., due to the fact that PDs are not coupled to every port), or to try to schedule additional UPS resource purchases to match inline power utilization growth. As a result the customer may either be forced to buy expensive resources that may never be used or suffer service interruptions during power disruptions due to deploying inadequate resources.

Accordingly, it would be desirable to allow customers to place a number of inline power-providing network devices on the same UPS resource without having to worry about supplying resources for the worst case scenario up front. Moreover, it would be desirable to allow the customers to oversubscribe the use of the UPS resource among a plurality of network devices while having the comfort of an early indication or warning when the aggregate load across all of the network devices enters a range close to but not exceeding the existing UPS resource capability.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1A:
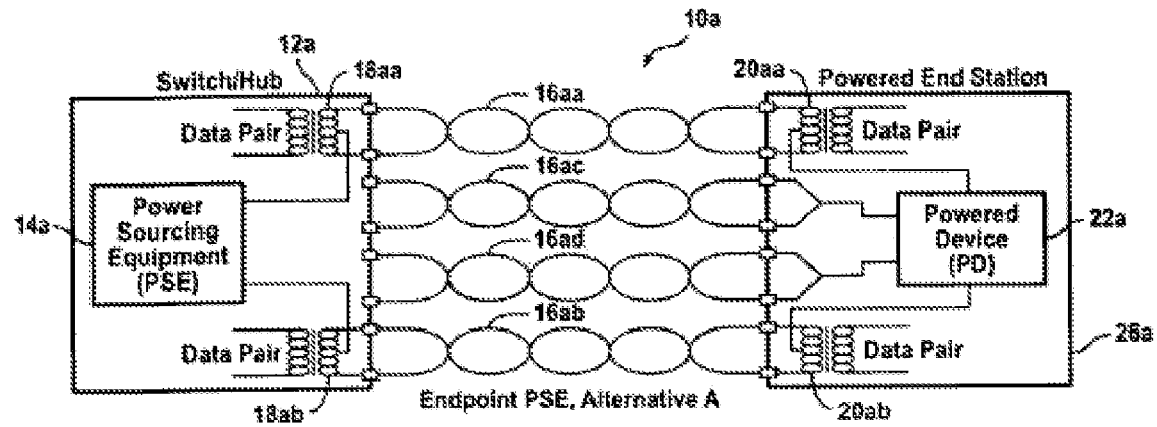
FIGS. 1A, 1B, 1C, 1D and 1E are electrical schematic diagrams of portions of data telecommunications networks in accordance with the prior art.
Figure 1B:
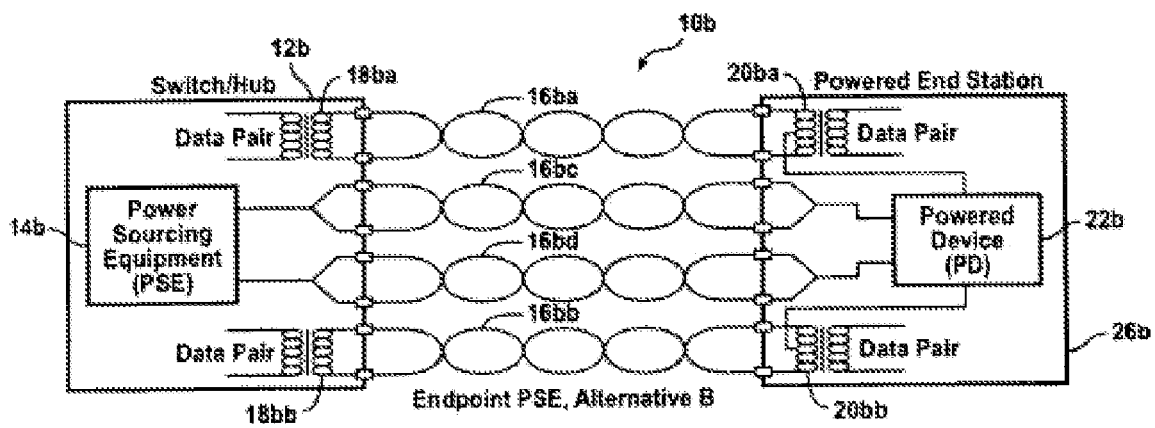
Figure 1C:
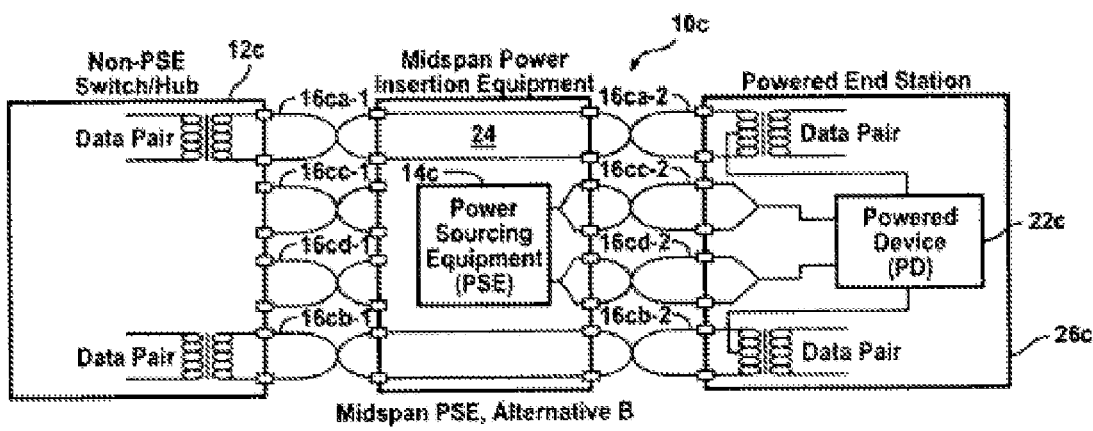
Figure 1D:
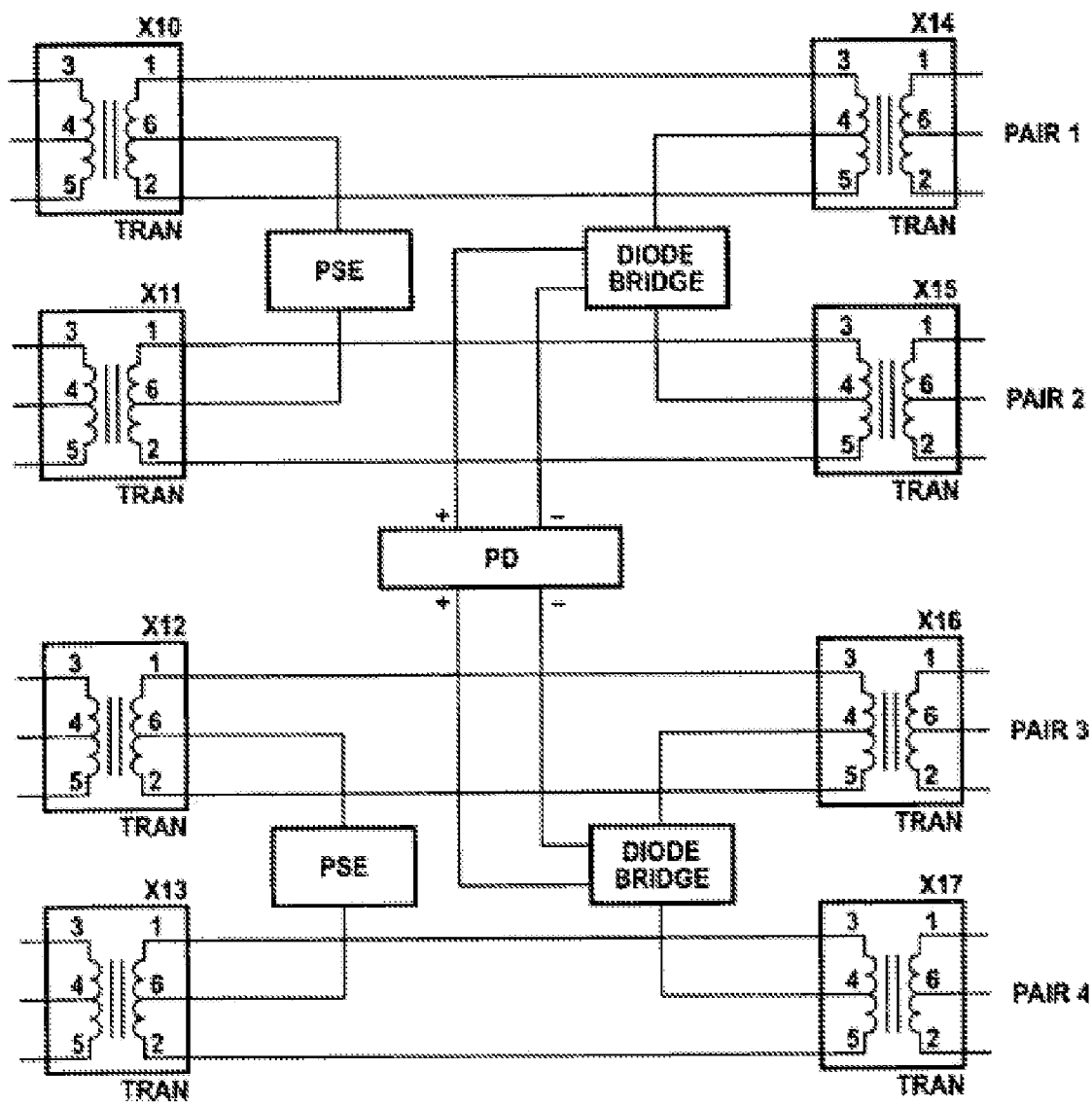
Figure 1E:
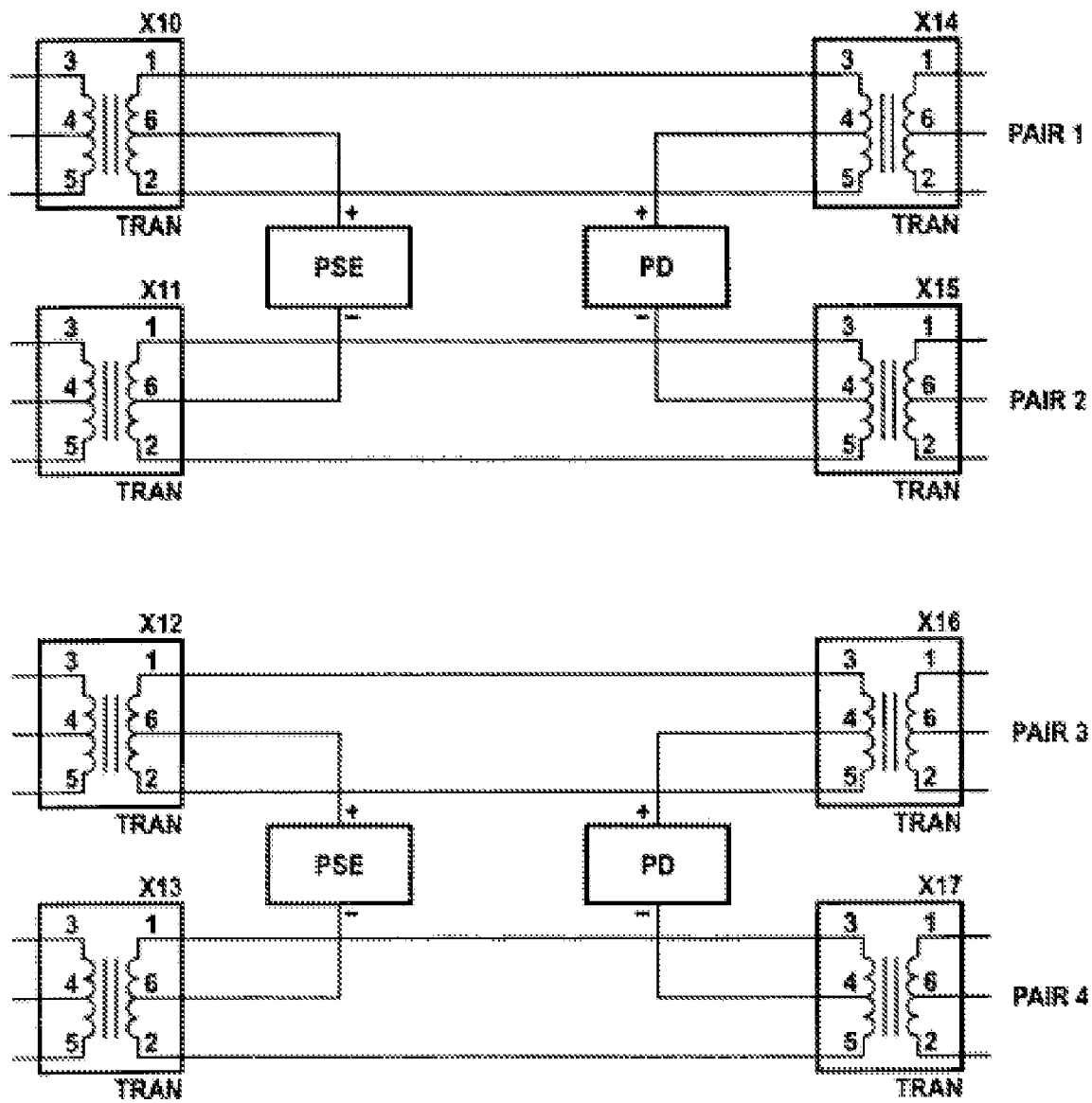
Figure 2:
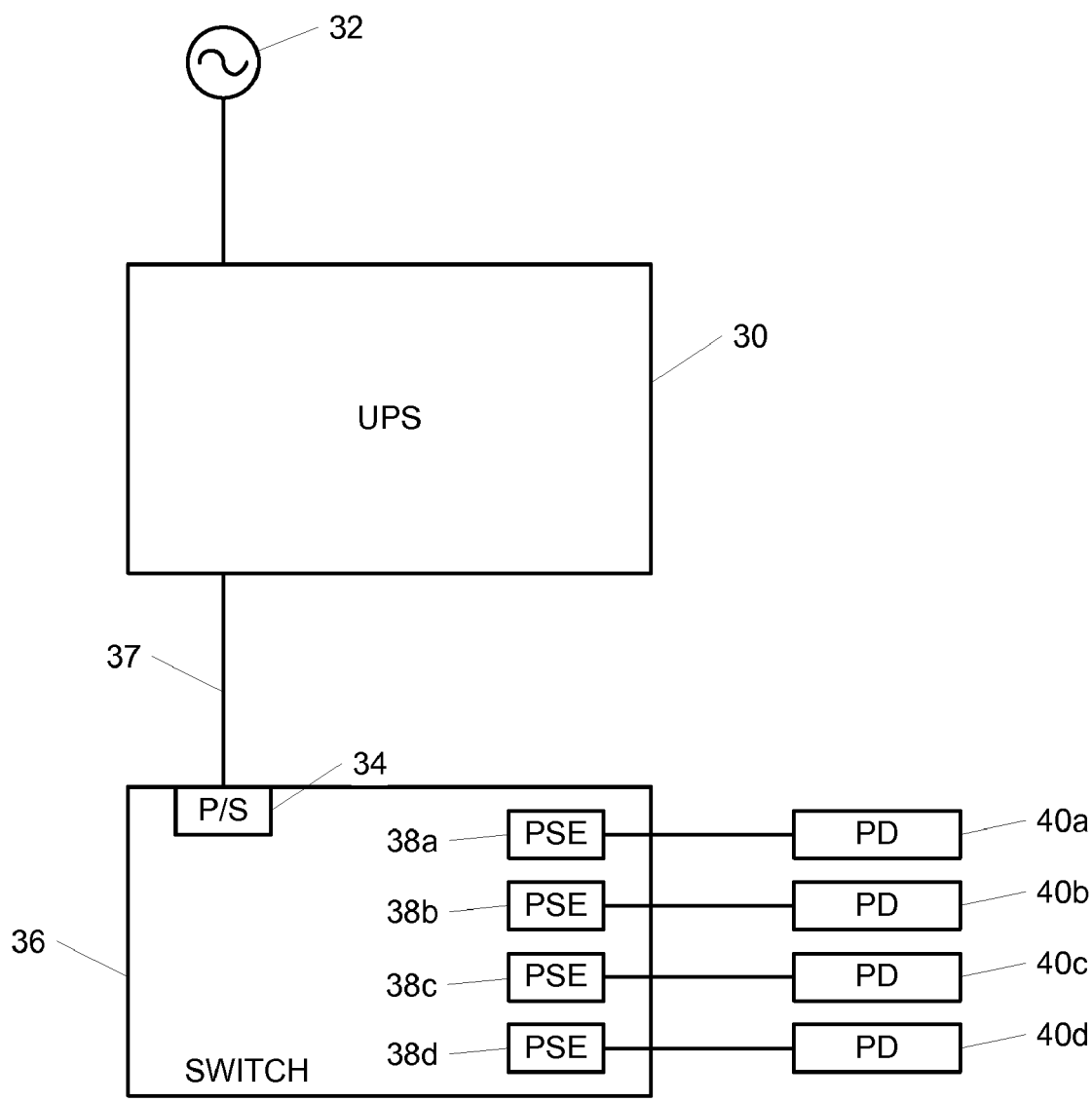
FIG. 2 is a block diagram illustrating a data telecommunications network configuration having a single network device (switch) and a UPS device providing power backup resources to a single power supply associated with the network device in accordance with the prior art.
Figure 3:
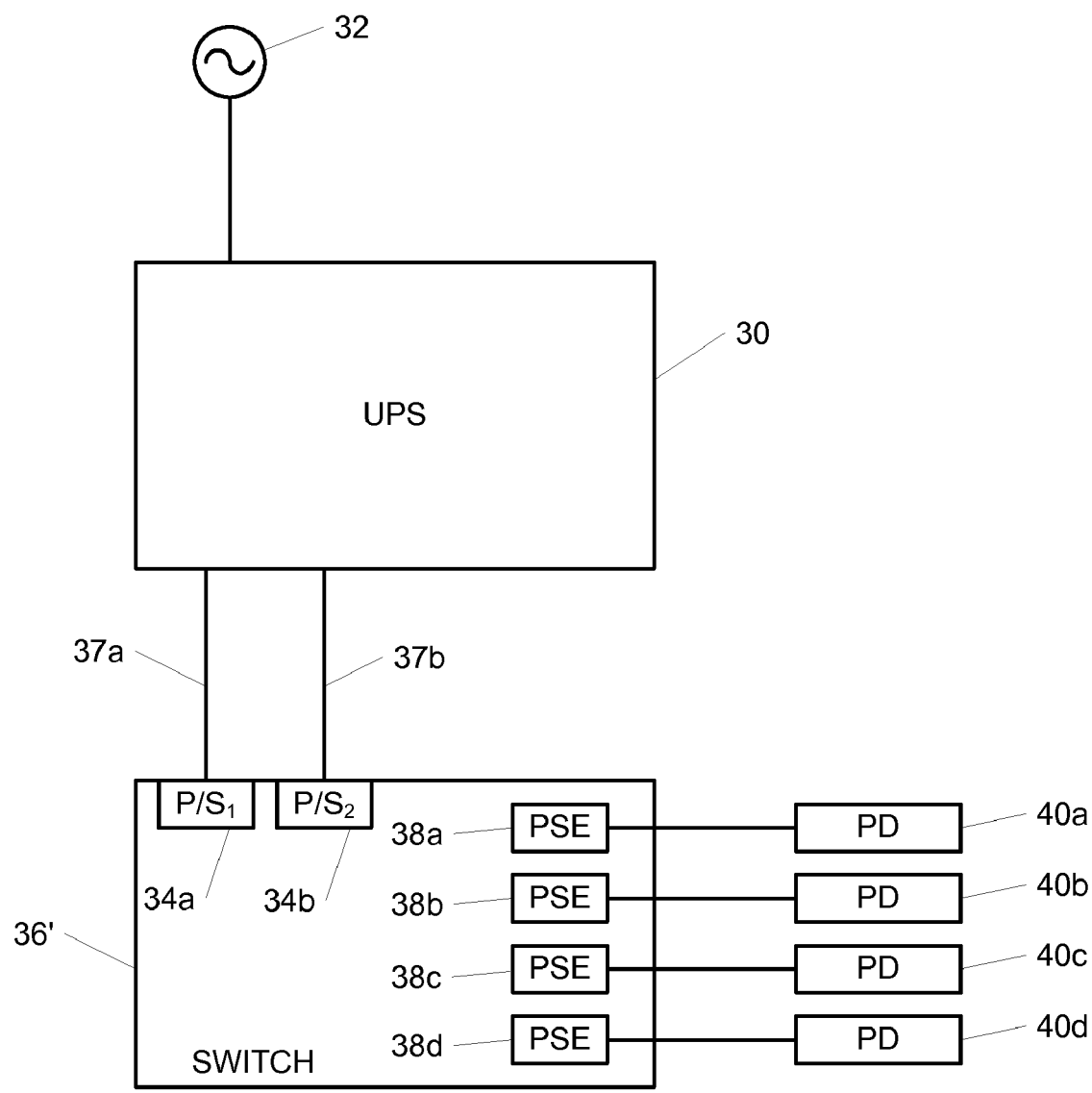
FIG. 3 is a block diagram illustrating a data telecommunications network configuration having a single network device (switch) and a UPS device providing power backup resources to a pair of power supplies associated with the network device in accordance with the prior art.
Figure 4:
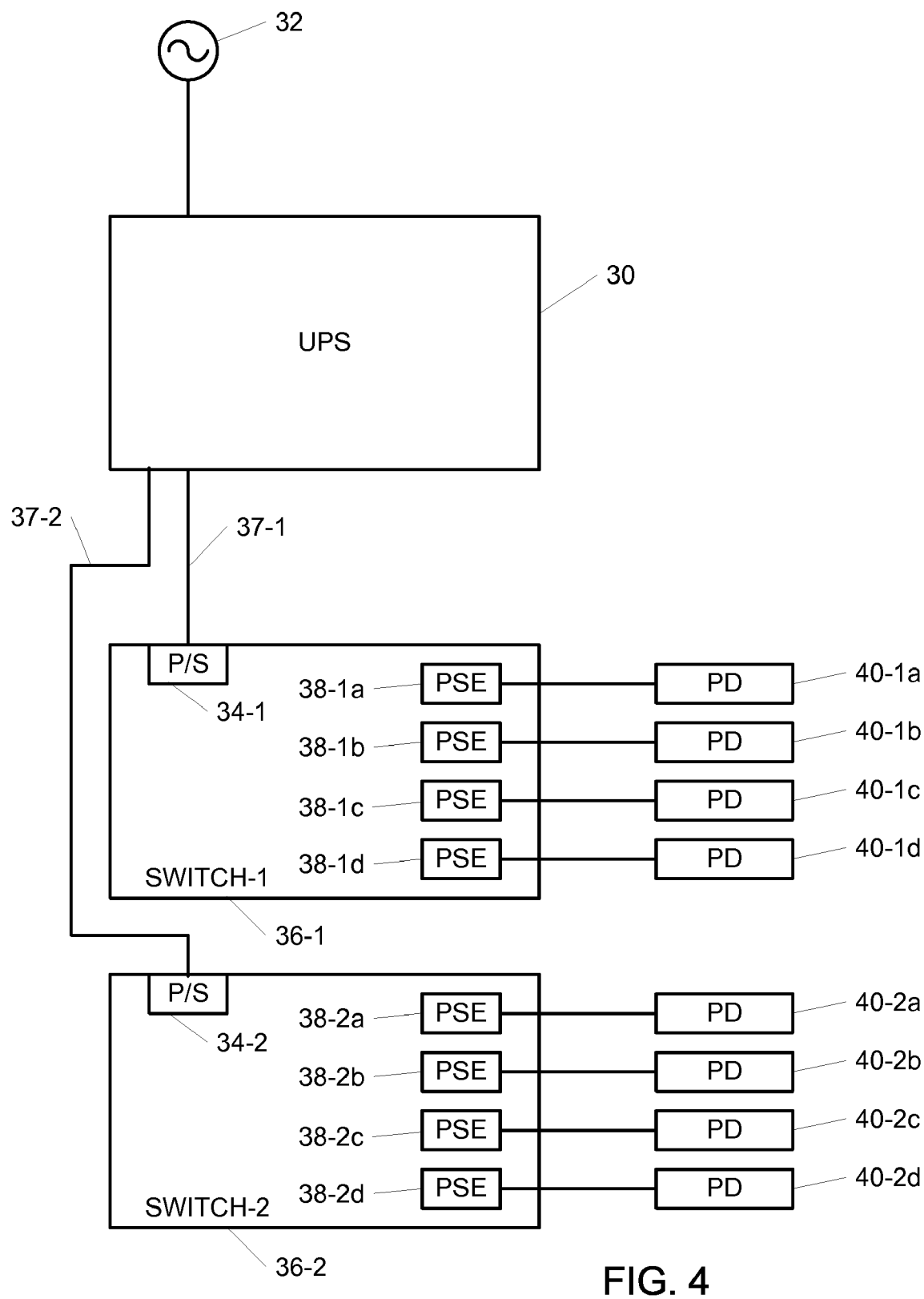
FIG. 4 is a block diagram illustrating a data telecommunications network configuration having a pair of network devices (switches) and a UPS device providing power backup resources to individual power supplies associated with the pair of network devices in accordance with the prior art.

Embodiments of the present invention described in the following detailed description are directed at multi-station physical layer communication over twisted-pair cable in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A UPS has a current (or, equivalently, a power) rating. If the current is exceeded, for a significant period of time, the UPS will generally shut down or a current limiting device such as a circuit breaker will activate to break the connection between the UPS and the load it is powering in order to prevent damage caused by a sustained overcurrent condition.

It is to be noted that UPS devices normally provide an essentially constant voltage (either AC (alternating current) or DC (direct current)) at a variable current which varies with load. Because of this fixed relationship between current and current multiplied by voltage (power) the terms are used interchangeably herein.

Where a UPS is responsible for providing backup power to a number of devices such as inline power devices coupled to an Ethernet switch with Ethernet cables, mistaken oversubscription is easily achieved. This is because an oversubscribed UPS may not be detected until a failure event occurs because the load on the UPS does not occur until the failure event. This is also due to the fact that PDs disposed on the LAN (local area network) and powered by a PSE port of the network device may be added and removed at will by users.

Existing UPS technology measures instantaneous current draw from its load in real time, however, there is no way for the UPS to know the potential worst case current draw from any measurement that it can make. This is not a particular problem in non-inline power systems, however, when multiple network devices providing inline power to attached PDs are attached to a single UPS resource, the worst case current demand can change frequently and dramatically. Furthermore, multicast and broadcast technologies can create a situation where a large number of network devices and their connected PDs experience their worst case current draw simultaneously. If more current is to be drawn than is available, it is often difficult to predict the resulting state of the UPS during a power outage, however, it may shut down or cause other equally undesirable conditions.

In a network deploying a plurality of network devices with PSE capabilities, a UPS resource may be effectively shared among those network devices by selecting at least one network device to be "master" and transmitting information reflecting worst case power commitments from "slave" network devices to the at least one master network device so that the master network device may keep track of the worst case power commitments of the plural network devices as a group. This information is compared to the known capabilities of the UPS resource and, where a deficiency or near-deficiency exists, the situation is communicated to network management for responsive action.

Figure 5:
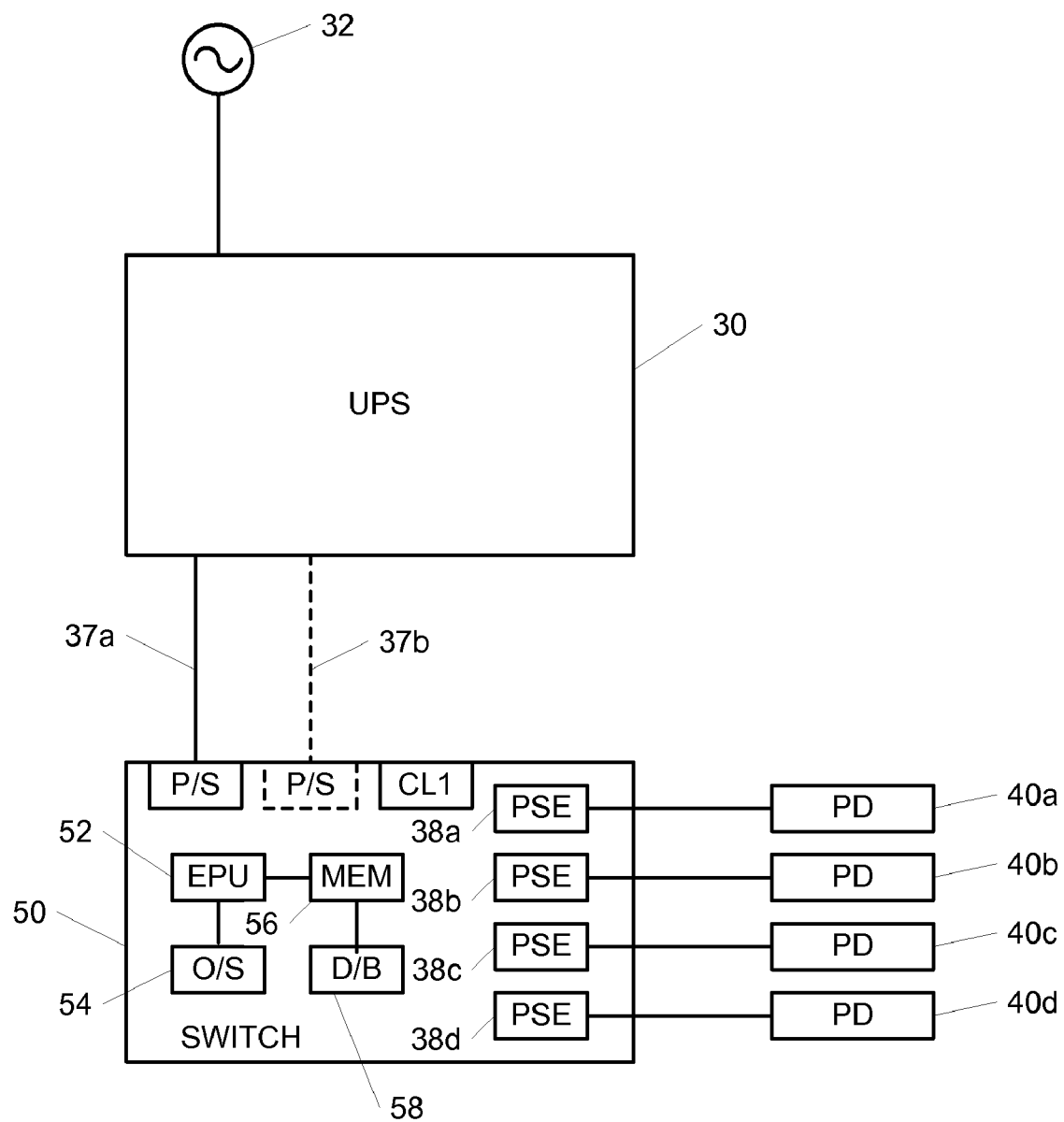
FIG. 5 is a system block diagram illustrating a data telecommunications network configuration having a single network device (switch) and a UPS device providing power backup resources to one or more individual power supplies associated with the network device in accordance with an embodiment of the present invention.

FIG. 5 is a system block diagram illustrating a data telecommunications network configuration having a single network device (switch) and a UPS device providing power backup resources to one or more individual power supplies associated with the network device in accordance with an embodiment of the present invention.

In accordance with an embodiment of the present invention as illustrated in FIG. 5, network device 50 (such as an Ethernet switch or similar network device) receives backup power from UPS 30 as described above. In this case, however, the network device 50 includes CPU (central processing device) 52 (which may be any suitable processing device for executing programmed instructions) running an operating system 54. Memory 56 associated with CPU 52 (i.e., it may be part of CPU 52 or coupled thereto) stores a database 58 containing information coding the worst case power requirements for attached PDs (40*a*-40*d*). Network device operating systems are well known in the art. For example, Cisco Systems, Inc. of San Jose, Calif. sells network devices which include such operating systems known as, for example, "IOS" or "Internetworking Operating System".

Figure 6:
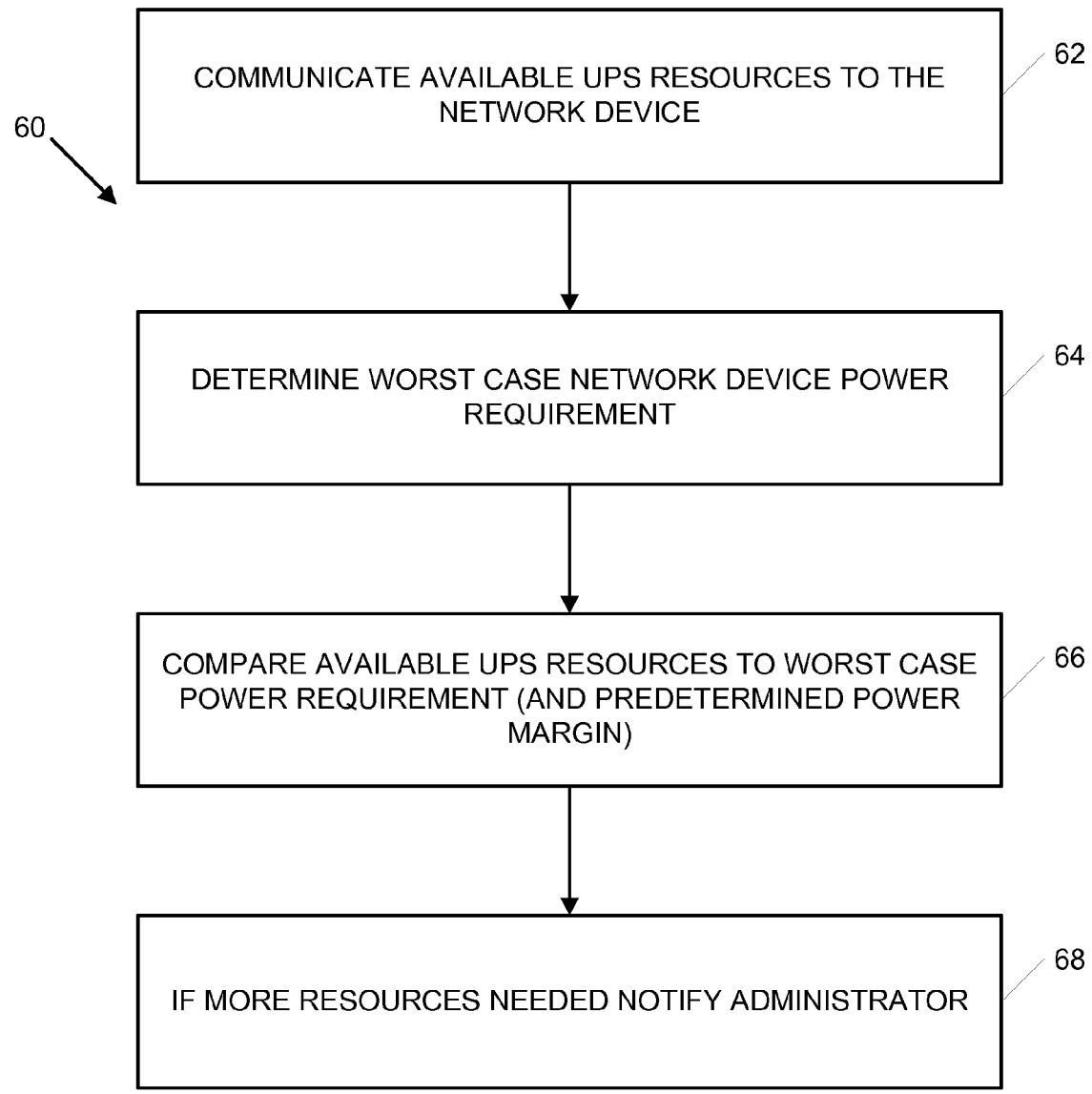
FIG. 6 is a method flow diagram for a method for utilizing UPS resources in accordance with an embodiment of the present invention.

FIG. 6 is a method flow diagram for a method for utilizing UPS resources in accordance with an embodiment of the present invention.

In accordance with the method 60 illustrated in FIG. 6, at block 62 the available UPS resources are communicated to the network device 50. This may be achieved in any number of ways. For example, they may be communicated manually by accessing the network device's OS 54 via a command line interface (CLI) in a conventional manner and configuring the OS accordingly. Alternatively, the network device 50 may be told via some form of data connection between the UPS 30 and the network device 50. This could include Ethernet packet communication or any other convenient form of communication.

At block 64 the worst case network device power requirements are determined. The network device is made aware of its own base power requirements, via, for example, the CLI as discussed above. Additionally, as the network device provides inline power to attached PDs from its PSE circuitry, it stores information in the database reflecting the inline power classes or raw power commitments made to those attached PDs. By summing these stored values, the OS of the network device may easily determine its inline power commitment, and by adding its base power requirement it may easily now determine for the network device a worst case power requirement. This is referred to as a worst case power requirement because it will only be reached if every PD is drawing its full allocated power at the same time that the network base power requirement is reached.

At block 66 the available UPS resources are compared by the OS to the worst case power requirement and optionally added to that worst case power requirement is any predetermined or selected power margin.

At block 68, if more resources are needed because the available UPS resources are exceeded by the worst case power requirement together with any optional predetermined power margin, then the OS of the network device causes it to send a notification. The notification may be sent as an e-mail or other form of message and may be sent in any number of ways, e.g., over the wired telecommunications network, over a telephone network, over a wireless local area network (WLAN), and may be sent to a network operations center or to a particular network administrative facility or administrator. Ultimately, however, the message will be directed to a network administrator who can act to increase UPS resources in order to help avoid a situation where a power failure takes down the network device because inadequate UPS resources are available.

The predetermined power margin may be set to some value. The value could be zero, i.e., no extra power margin. But, in many cases it will be helpful to set the value to something other than zero. For example, if the value is set to 10% of the total UPS resources, then a notification will be generated when there is still a 10% cushion between the available UPS resources and the worst case power requirement of the network device based on committed UPS resources.

Figure 7:
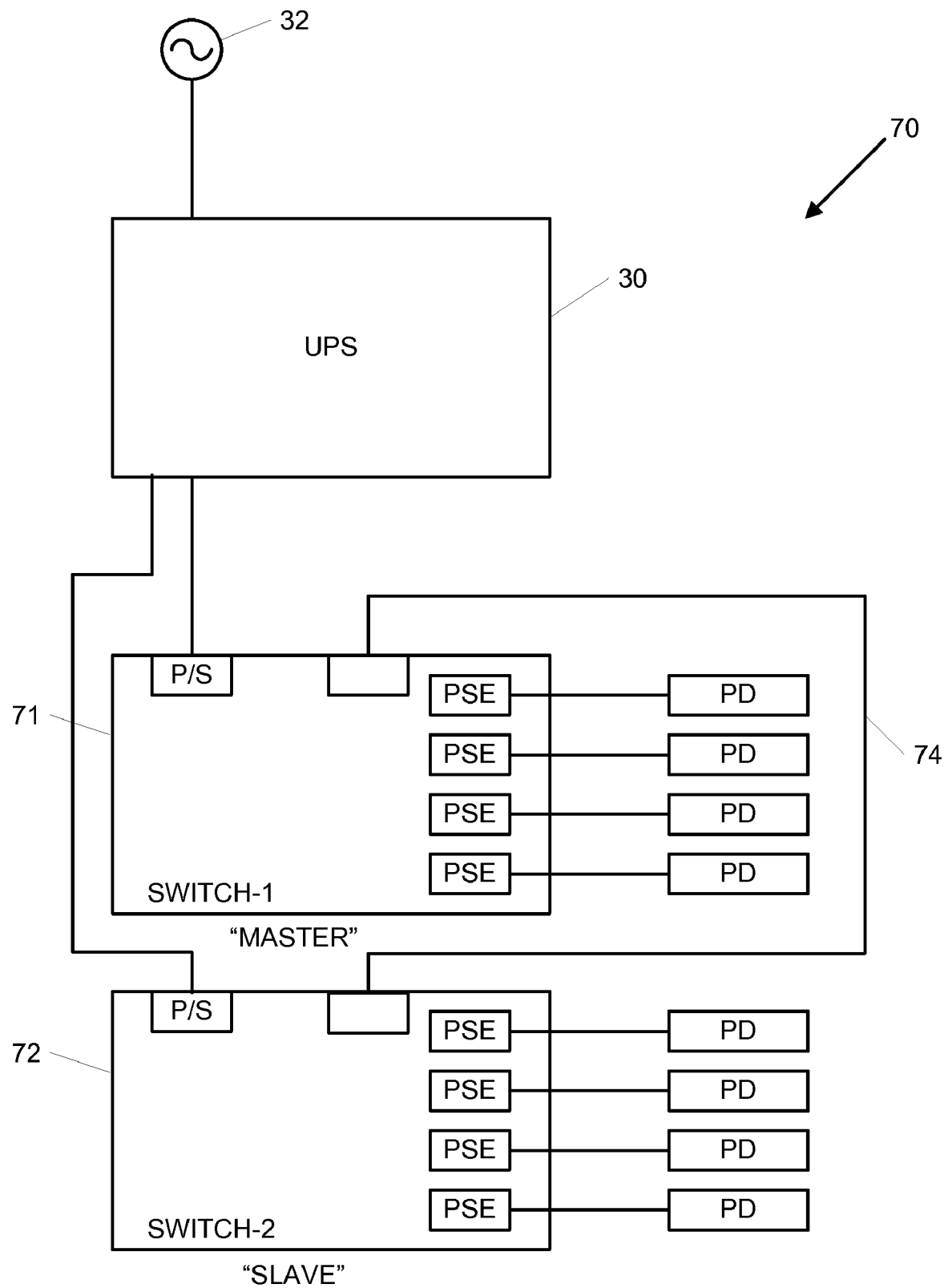
FIG. 7 is a system block diagram illustrating a data telecommunications network configuration having a pair of network devices (switches) and a UPS device providing power backup resources to one or more individual power supplies associated with the network devices in accordance with an embodiment of the present invention.

FIG. 7 is a system block diagram illustrating a data telecommunications network configuration 70 having a pair of network devices (shown as switches) 71 and 72 and a UPS device 30 providing power backup resources to one or more individual power supplies associated with the network devices 71, 72 in accordance with an embodiment of the present invention.

The FIG. 7 configuration makes use of two or more network devices 71, 72 which are like network device 50 of FIG. 5. The difference is that there are two (or more) network devices, at least one (preferably one) is selected as "master", and a data communication path 74 is provided between the master network device and all other network devices sharing the UPS resources.

Selection of a "master" is achieved in any convenient manner. For example, the CLI may be used to set one (or more) network devices to be the master, or a packet of information may be sent to the network device (as in the form of a configuration packet from a configuration point such as a network operations center), or the like. While more than one network device could be the "master", there would be no advantage to having more than one and selecting more than one would somewhat complicate the programming instructions required to manage the UPS resources. In any event, a "master" operates by obtaining committed power resource information from the other network devices sharing the UPS resource. It sums this information and compares it to known available resources to determine whether a notification of insufficient UPS resources should be sent to an administrator.

Data communication among network devices may be achieved in any convenient manner. They may be coupled via the wired data telecommunications network itself, via WLAN, or otherwise. The information to be sent from non-master network devices to the master network device(s) can be a replication of their respective databases, or summary information derived from those databases. Only the summary information need be sent, e.g., a worst case power requirement for the network device. The information may be sent periodically, when polled by the master network device, or when changes at the non-master network device exceed some predetermined, optionally programmable, threshold. For example, the non-master network device could be configured to send worst case power requirement information to the master network device whenever the current requirement exceeds the last-sent requirement by 5% (or some other appropriate value). In this way, data traffic can be minimized with little loss of efficacy.

Figure 8:
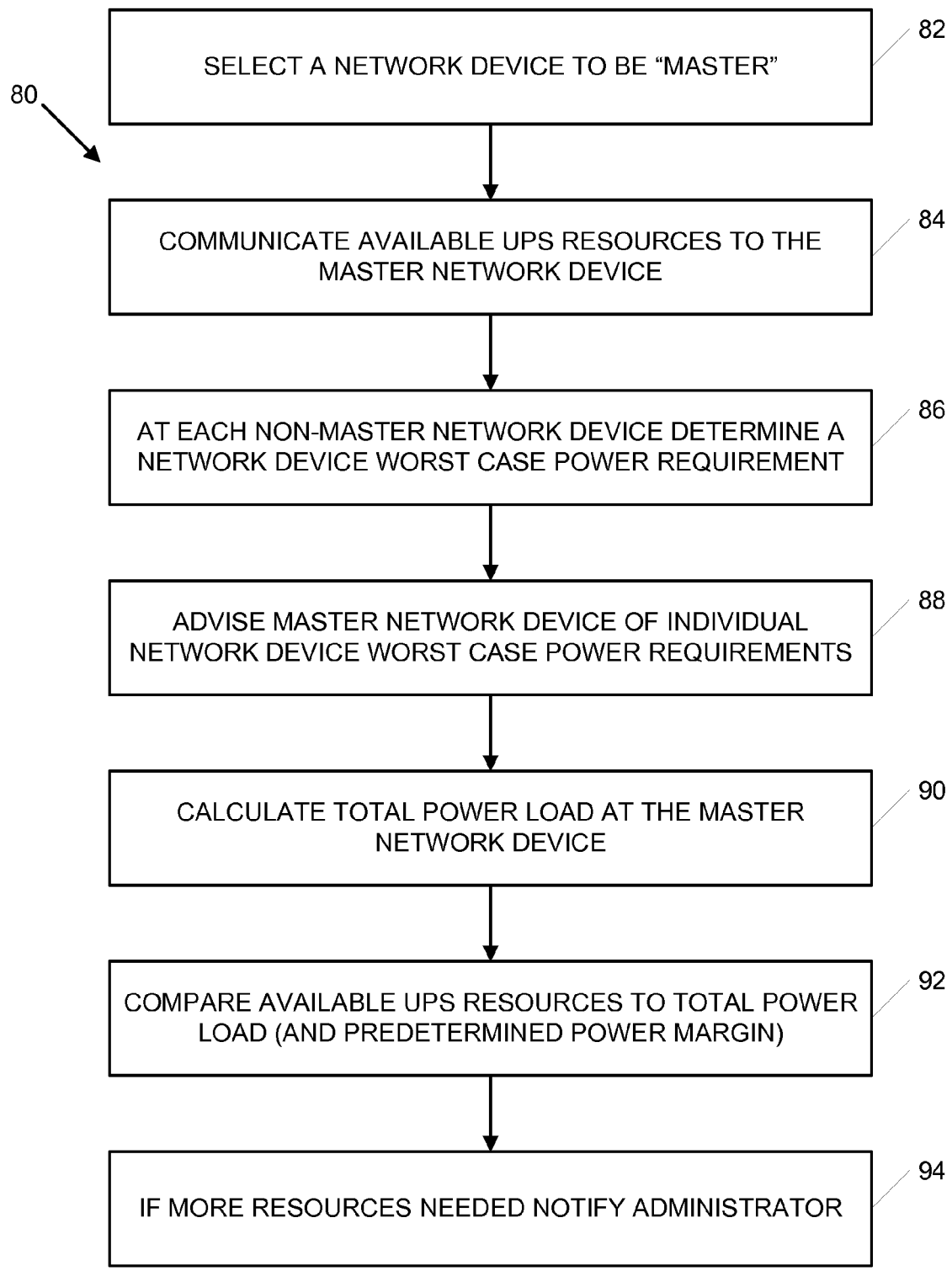
FIG. 8 is a method flow diagram for a method for utilizing UPS resources in accordance with another embodiment of the present invention.

FIG. 8 is a method flow diagram for a method for utilizing UPS resources in accordance with another embodiment of the present invention.

FIG. 8 illustrates a method useable with the network configuration shown in FIG. 7. At block 82 a network device is selected to be the "master". This may be achieved via CLI, control packets, first network device turned on, or it may be decided among the network devices in a random back-off fashion.

At block 84 available UPS resources are communicated to the master network device. This is as described before in respect of FIG. 6.

At block 86 each non-master network device determines its own worst case power requirement. This may be done by transmitting the database to the master, or more efficiently by its OS summing over its commitments to attached PDs as reflected in its database. Generally the base power requirement of the switch will either be added in at this point or presumed by the master later. Optionally, a predetermined additional power margin may also be added when reporting the worst case power requirement of a particular network device. This additional margin will allow the network device to undertake additional power commitments up to that margin without inadvertently creating an overcurrent condition at the UPS.

At block 88 each network device advises the master of its power requirements. As discussed above, this may be done periodically, upon polling, upon significant change, or in any other convenient manner.

At block 90 the master network device calculates a total power load by summing the information provided by the non-master network devices and adding in the master's worst case power requirement (and optionally a predetermined power margin as discussed above).

At block 92, as before, a comparison is conducted and at block 94, if more resources are required, a notification is initiated.

While embodiments and applications of this invention have been shown and described, it will now be apparent to those skilled in the art having the benefit of this disclosure that many more modifications than mentioned above are possible without departing from the inventive concepts disclosed herein. For example, the invention is useable with IEEE 802.3af inline power but it is contemplated that it will be useable with future versions of that standard and other similar approaches that have or may be developed. In that regard it is also useable with a system for providing inline power known as Cisco legacy power used on certain Cisco Systems, Inc. products. Furthermore, network devices not providing inline power are also useable with the invention described herein and such network devices would report their respective base power requirements and any additional predetermined power margin but would not report power requirements for attached PDs as there would be none to report. Accordingly, the appended claims are intended to encompass within their scope all such modifications as are within the true spirit and scope of this invention.

What is claimed is:

1. A method for utilizing uninterruptible power supply (UPS) resources in a wired data telecommunications network with at least one network device configured to provide inline power to attached powered devices (PDs), the network device having a base power requirement and configured to receive backup power from the UPS resources, the method comprising:

communicating to the network device an amount of available UPS resources;

determining at the network device a worst case power requirement for the network device; said worst case power requirement including any power requirements of powered devices drawing power through the network device; and comparing at the network device worst case power requirement for the network device with the amount of available UPS resources and, if the available UPS resources do not meet or exceed the worst case power requirement for the network device in addition to any predetermined power margin, transmitting a message to that effect to a network administrator.

2. The method of claim 1, wherein said determining includes:

summing the worst case power requirements for all attached PDs.

3. The method of claim 1, wherein said determining includes:

summing the worst case power requirements for all attached PDs and the base power requirement of the network device.

4. The method of claim 1, wherein said communicating includes:

using a command line interface (CLI).

5. The method of claim 1, wherein said communicating includes:

using an Ethernet packet.

6. A method for utilizing uninterruptible power supply (UPS) resources in a wired data telecommunications network having a plurality of network devices configured to provide inline power to respective attached powered devices (PDs), the network devices each having a respective base power requirement and configured to receive backup power from the UPS resources, the method comprising:

selecting one master network device from among the plurality of network devices;

communicating to the master network device an amount of available UPS resources;

determining at each network device other than the master network device a network device worst case power requirement, said worst case power requirement including any power requirements of powered devices drawing power through the network device;

advising the master network device of each said determined network device worst case power requirement;

calculating a total power load at the master network device; and comparing at the master network device the total power load with the amount of available UPS resources, and, if the available UPS resources do not meet or exceed the total power load in addition to any predetermined power margin, transmitting a message to that effect to a network administrator.

7. The method of claim 6, wherein said determining includes:

summing the worst case power requirements for all attached PDs.

8. The method of claim 6, wherein said determining includes:

summing the worst case power requirements for all attached PDs and the respective base power requirement of the respective network device.

9. The method of claim 6, wherein said calculating includes:

summing the worst case power requirements of the non-master network devices and a worst case power requirement of the master network device.

10. The method of claim 9, wherein said worst case power requirement of the master network device includes the worst case power requirements for all PDs attached to the master network device together with a base power requirement for the master network device.

11. The method of claim 6, wherein said communicating includes:
using a command line interface (CLI).

12. The method of claim 6, wherein said communicating includes:
using an Ethernet packet.

13. The method of claim 6, wherein said advising includes:
using a command line interface (CLI).

14. The method of claim 6, wherein said advising includes:
using an Ethernet packet.

15. A system for utilizing uninterruptible power supply (UPS) resources in a wired data telecommunications network with at least one network device configured to provide inline power to attached powered devices (PDs), the network device having a base power requirement and configured to receive backup power from the UPS resources, the system comprising:
means for communicating to the network device an amount of available UPS resources;
means for determining at the network device a worst case power requirement for the network device, said worst case power requirement including any power requirements of powered devices drawing power through the network device; and
means for comparing at the network device the worst case power requirement for the network device with the amount of available UPS resources and, if the available UPS resources do not meet or exceed the worst case power requirement for the network device in addition to any predetermined power margin, transmitting a message to that effect to a network administrator.

16. The system of claim 15, wherein said means for determining includes:
means for summing the worst case power requirements for all attached PDs.

17. The system of claim 15, wherein said means for determining includes:
means for summing the worst case power requirements for all attached PDs and the base power requirement of the network device.

18. The system of claim 15, wherein said means for communicating includes:
a command line interface (CLI).

19. The system of claim 15, wherein said means for communicating includes:
means for receiving an Ethernet packet.

20. A system for utilizing uninterruptible power supply (UPS) resources in a wired data telecommunications network having a plurality of network devices configured to provide inline power to respective attached powered devices (PDs), the network devices each having a respective base power requirement and configured to receive backup power from the UPS resources, the system comprising:
means for selecting one master network device from among the plurality of network devices;
means for communicating to the master network device an amount of available UPS resources;
means for determining at each network device other than the master network device a network device worst case power requirement, said worst case power requirement including any power requirements of powered devices drawing power through the network device;
means for advising the master network device of each said determined network device worst case power requirement;
means for calculating a total power load at the master network device; and means for comparing at the master network device the total power load with the amount of available UPS resources, and, if the available UPS resources do not meet or exceed the total power load in addition to any predetermined power margin, transmitting a message to that effect to a network administrator.

21. The system of claim 20, wherein said determining includes:
means for summing the worst case power requirements for all attached PDs.

22. The system of claim 20, wherein said means for determining includes:
means for summing the worst case power requirements for all attached PDs and the respective base power requirement of the respective network device.

23. The system of claim 20, wherein said means for calculating includes:
means for summing the worst case power requirements of the non-master network devices and a worst case power requirement of the master network device.

24. The system of claim 23, wherein said worst case power requirement of the master network device includes the worst case power requirements for all PDs attached to the master network device together with a base power requirement for the master network device.

25. The system of claim 20, wherein said means for communicating includes:
a command line interface (CLI).

26. The system of claim 20, wherein said means for communicating includes:
means for receiving an Ethernet packet.

27. The system of claim 20, wherein said means for advising includes:
a command line interface (CLI).

28. The system of claim 20, wherein said advising includes:
means for receiving an Ethernet packet.

29. A program storage device readable by a network device, tangibly embodying a program of instructions executable by the network device to perform a method for utilizing uninterruptible power supply (UPS) resources in a wired data telecommunications network with at least one network device configured to provide inline power to attached powered devices (PDs), the network device having a base power requirement and configured to receive backup power from the UPS resources, comprising:
receiving at the network device an amount of available UPS resources;
determining at the network device a worst case power requirement for the network device, said worst case power requirement including any power requirements of powered devices drawing power through the network device; and
comparing at the network device the worst case power requirement for the network device with the amount of available UPS resources and, if the available UPS resources do not meet or exceed the worst case power requirement for the network device in addition to any predetermined power margin, transmitting a message to that effect to a network administrator.

30. A program storage device readable by a master network device, tangibly embodying a program of instructions executable by the master network device to perform a method for utilizing uninterruptible power supply (UPS) resources in a wired data telecommunications network having a plurality of network devices configured to provide inline power to respective attached powered devices (PDs), the network devices each having a respective base power requirement and configured to receive backup power from the UPS resources, comprising:

receiving at the master network device information reflecting an amount of available UPS resources;

receiving from each network device other than the master network device a network device worst case power requirement, said worst case power requirement including any power requirements of powered devices drawing power through the network device;

calculating a total power load at the master network device; and comparing at the master network device the total power load with the amount of available UPS resources, and, if the available UPS resources do not meet or exceed the total power load in addition to any predetermined power margin, transmitting a message to that effect to a network administrator.

31. A network device configured for use in a wired data telecommunications network, the network device configured to provide inline power to attached powered devices (PDs), the network device having a base power requirement and configured to receive backup power from Uninterruptible power Supply (UPS) resources, comprising:

a reception facility configured to receive information reflecting an amount of available UPS resources;

a determiner configured to determine a worst case power requirement for the network device, said worst case power requirement including any power requirements of powered devices drawing power through the network device;

a comparer configured to compare the worst case power requirement for the network device with the amount of available UPS resources; and a transmission facility configured to transmit a message to a network administrator indicating a need for additional UPS resources in response to the comparer having determined that available UPS resources do not meet or exceed the worst case power requirement for the network device in addition to any predetermined power margin.

32. The device of claim 31, wherein said determiner is configured to sum the worst case power requirements for all attached PDs.

33. The device of claim 31, wherein said determiner is configured to sum the worst case power requirements for all attached PDs and the base power requirement of the network device.

34. The device of claim 31, wherein said reception facility includes a command line interface (CLI).

35. The method of claim 31, wherein said reception facility includes an Ethernet packet receiver.

36. A network device configured for use in a wired data telecommunications network having a plurality of network devices configured to provide inline power to respective attached powered devices (PDs), the network devices each having a respective base power requirement and configured to receive backup power from Uninterruptible Power Supply (UPS) resources, comprising:

a selector for configuring the network device to be a master network device;

a first reception facility configured to receive information reflecting an amount of available UPS resources;

a second reception facility configured to receive from each network device other than the master network device a network device worst case power requirement, said worst case power requirement including any power requirements of powered devices drawing through the network device;

a calculator configured to calculate a total power load at the master network device;

a comparer configured to compare the total power load with the amount of available UPS resources; and a transmission facility configured to transmit a message to a network administrator indicating a need for additional UPS resources in response to the comparer having determined that available UPS resources do not meet or exceed the total power load in addition to any predetermined power margin.

37. The device of claim 36, wherein said calculator is configured to sum the worst case power requirements of the non-master network devices and a worst case power requirement of the master network device.

38. The device of claim 37, wherein said worst case power requirement of the master network device includes the worst case power requirements for all PDs attached to the master network device together with a base power requirement for the master network device.

39. The device of claim 36, wherein said first reception facility includes a command line interface (CLI).

40. The device of claim 36, wherein said first reception facility includes an Ethernet packet receiver.

\* \* \* \* \*

UNITED STATES PATENT AND TRADEMARK OFFICE
CERTIFICATE OF CORRECTION

PATENT NO. : 7,565,555 B2 Page 1 of 1
APPLICATION NO. : 11/286176
DATED : July 21, 2009
INVENTOR(S) : Wael William Diab It is certified that error appears in the above-identified patent and that said Letters Patent is hereby corrected as shown below:

Claim 31, Column 13, Line 24, "power Supply (UPS) resources, comprising:" should read --Power Supply (UPS) resources, comprising:--.

Signed and Sealed this

First Day of September, 2009

David J. Kappos
*Director of the United States Patent and Trademark Office*